Figure 1:
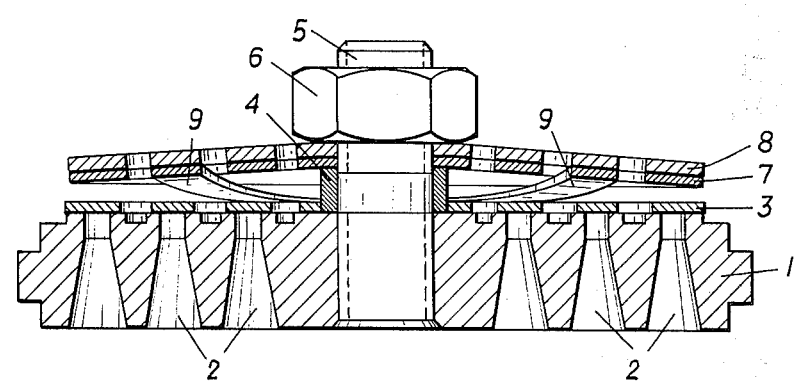

United States Patent [19]
Riedel

[11] 3,945,397
[45] Mar. 23, 1976

[54] PLATE VALVE

[75] Inventor: Albert F. Riedel, Schongau (Lech), Germany

[73] Assignee: Hoerbiger Ventilwerke Aktiengesellschaft, Vienna, Austria

[22] Filed: Apr. 4, 1974

[21] Appl. No.: 458,028

[30] Foreign Application Priority Data
Apr. 1, 1973   Austria .............................. 3176/73

[52] U.S. Cl. ............ 137/514; 137/516.21; 137/529
[51] Int. Cl.² ......................................... F16K 15/08
[58] Field of Search............ 137/512.1, 512.15, 514, 137/516.11–516.23, 529

[56] References Cited
UNITED STATES PATENTS
1,464,837   8/1923   Wikander ..................... 137/516.23

FOREIGN PATENTS OR APPLICATIONS
279,541   10/1927   United Kingdom............ 137/516.21
788,268   12/1957   United Kingdom............ 137/516.19
550,403   1/1943   United Kingdom............ 137/516.13

*Primary Examiner*—Robert G. Nilson
*Attorney, Agent, or Firm*—Watson, Cole, Grindle & Watson

[57] ABSTRACT

A plate valve comprises a domed resilient catcher plate positioned above a valve seat to limit the stroke of a valve closure plate controlling fluid flow through passages in the valve seat. The catcher plate has its concave surface facing the valve seat and is held in position only in the region of the valve axis, the outer edge of the catcher plate being free.

6 Claims, 2 Drawing Figures

PLATE VALVE

This invention relates to plate valves and particularly to automatic doughnut shaped disc plate valves, of particular use in reciprocating compressors, such valves having an elastic catcher for limiting the opening stroke of a closure plate controlling fluid passage channels in a valve seat.

It is conventional for the catcher plate of a doughnut shaped disc plate valve to be formed so that it is resilient by being comprised of tin plates pressed one over the other in layers and secured against rotation. By this means, in contrast to the solid catcher plates used practically exclusively hitherto, impact noises are reduced and the danger of plate breakage is minimized. However, little success was obtained with catcher plates of this type because of the slight dampening effect of the opening impacts of the closure plate obtained and because the manufacture and assembly of the catcher plate consisting of several plates is complicated.

The present invention seeks to reduce the danger of breakage of the plate components by damping the opening impacts, and of reducing the manufacturing costs by simplification and reduction in price of the catcher plate.

The invention provides a plate valve having an elastic catcher plate arranged in spaced relationship over a valve seat for limiting the opening stroke of a closure plate controlling passage means in the valve seat wherein the catcher plate is formed as a domed spring with its concave surface facing the valve seat. The catcher plate is fixedly clamped in the region of the valve axis in spaced relationship from the valve seat and having free outer edge portions.

The catcher plate thus consists not of merely a few elastic flat plates placed one over the other, but is itself formed as a flexible plate-shaped spring which is clamped only at its inner edge and at its outer edge can move freely so that by elastic yielding it catches the closure plate and any further plate components, in particular the spring plates. The catcher plate is preferably of parabolic shape which makes its spring characteristic progressive, whereby the damping behaviour is still further improved. Since the hollow or concave surface of the catcher faces the valve seat, the edge of the closure plate most likely to break meets the catcher first, with the result that wobbling movements are moderated and the closure plate itself is elastically deformed by the sagging of its central region which leads to a further reduction of the movement energy. At the beginning of the closure movement of the closure plate the elastically deformed catcher plate supports the closing forces so that the closure movement is initiated promptly. In detaching themselves from the catcher surface the entire surface of the closure plate and any further plates is not involved simultaneously; the detaching process begins at the inner edge because of the domed shape of the catcher and progresses radially outwards, thus minimizing the risk of late closures that could occur with the use of flat catcher plates by the adhesion of the plates with the catcher plate surface, for instance if there is oil or some other fluid between the plates. The domed plate used as a catcher plate is inexpensive to manufacture and can be simply mounted.

With solid rigid catcher plates it is conventional for the impact surface facing the valve seat to be conical. Thus, the stroke of the closure plate at the outer edge is made smaller in order to reduce the risk of breakage. This results in a reduction in the flowthrough cross-section of the valve at its outer edge. Moreover, because of the rigid catcher plate it is not possible to achieve satisfactory damping of the impact.

According to a preferred form of the invention the height of the elastic catcher member in the direction of the valve axis amounts to 40–60% of the stroke of the closure plate. Tests have shown that with this construction it is possible to obtain an advantageous stroke movement of the closure plate with satisfactory damping of the opening impact and initiation of the closure movement taking place at the correct point of time, without the timely opening of the valve being prevented by the resilient catcher plate. Preferably, the stiffness of the domed spring forming the catcher is such that under the influence of the impact energy of the closure plate and of the flow forces it is deformed approximately in one plane during the opening stroke, so that the valve has the maximum throughflow cross-section. The attainment of this result is facilitated by the closure plate and any further plates arranged in the valve impinging on the fixedly clamped inner edge of the catcher plate as soon as the catcher plate reaches the flat position. Also, when this position is exceeded, the closure plate and attendant structure deform themselves plate-like and by their own elasticity counteract any further movement. Consequently, the necessary spring force of the domed catcher plate can therefore be achieved with a catcher plate that is as thick, or only insignificantly thicker than, the closure plate. In a further development of the invention flexible spring arms, ring sections or the like, can be bent outwardly of the catcher plate towards the valve seat, which press the closure plate on to the valve seat. In this arrangement the elastic catcher plate also takes over the task of making the valve resilient so that its own closure springs can be omitted.

Figure 2:
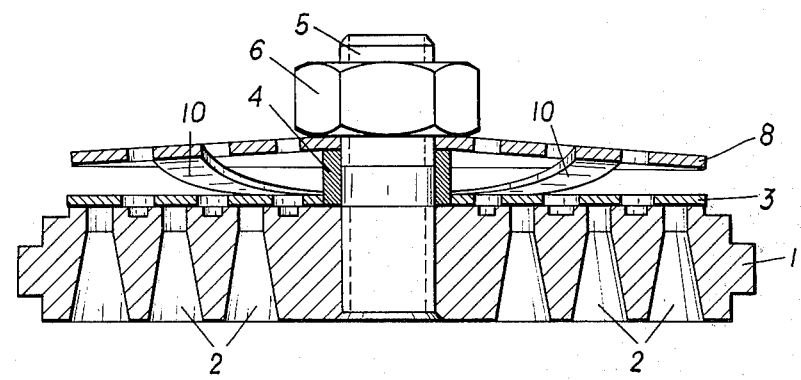

The invention will now be described by way of example with reference to the accompanying drawings in which:

FIGS. 1 and 2 are both axial sections through alternative forms of doughnut shaped disc plate valves according to the invention.

In the embodiment according to FIG. 1 there is a valve seat 1 having passage channels 2 controlled by a slidingly carried closure plate 3. In the closed position the closure plate 3 rests on the valve seat 1. The sliding of plate 3 takes place on a guide ring 4 fixed to the valve seat 1 by a screw 5 and a nut 6. Between the guide ring 4 and the nut 6 are fixedly clamped a spring plate 7 and a catcher plate 8. Flexible spring arms 9 are bent out of the spring plate 7 and rest on the closure plate 3 to press plate 3 resiliently against the valve seat 1.

The catcher plate 8 is formed as a domed spring with its concave side facing the valve seat 1. The dome shape of the catcher plate is preferably parabolic. The height of the catcher plate 8 measured in the direction of the valve axis amounts to approximately half the stroke of the closure plate 3 at the periphery of the guide ring 4. The spring plate 7, which when assembled can be flat and is considerably thinner than the catcher plate 8, conforms closely to the catcher plate by reason of its own elasticity. Over the outer edge of the closure plate 3 there thus lies at approximately half the stroke height, the edge of the catcher plate 8 with the spring plate 7 abutting against it. Since the catcher plate 8 is fixedly clamped at the valve seat axis only by its inner edge, its outer edge projects freely towards the valve seat 1 and can move freely elastically in the stroke direction of the closure plate 3. The thickness of the catcher plate 8 coincides approximately to that of the closure plate 3.

When the closure plate 3, affected by a pressure medium striking upon it through the passage channels 2, is lifted from the valve seat 1, it slides along the guide ring 4 upwards against the force of the spring arms 9. When this happens its outer edge meets the outer edge first of the catcher plate 8 and/or of the spring plate 7 positioned in front of it. The catcher plate 8 is thereby elastically bent upwardly, the closure plate 3 coming into contact with the catcher assembly progressively from the outside inwardly. The closure plate 3 is thereby elastically caught so that an effective damping of the opening movement is achieved. With a parabolic construction of the catcher plate its spring characteristic and thereby the damping effect is progressively amplified. As soon as the inner edge of the closure plate 7 has executed the complete stroke, and at the top end of the stroke strikes against the catcher 8 or against the spring plate 7 which is clamped to the catcher plate, the elasticity of the closure plate 3 counteracts any further upward movement of the outer region of the closure plate 3. In this manner the damping force is considerably increased still further. In the top position of the closure plate 3 and the catcher plate 8 then takes up an approximately flat position.

Closure of the plate 3 takes place under the effect of the force of the elastically deformed catcher plate 8, the spring arms 9 and fluid flow forces in the reverse direction, whereby the inner edge of the closure plate 3 first detaches itself from the catcher plate 8 and from the spring plate 7. In the upper or top end position of the closure plate 3 and comparatively large closure force acts on it so that a timely initiation of the closure movement is ensured. By the detaching of the closure plate 3 from the spring plate 7 and from the catcher plate 8, beginning at the inner edge and continuing radially outwardly, adhesion effects are minimized. This adhesion effect is the result of valves becoming smeared by the presence of an oil film between the plates and can lead to late closure, which results in the closure plate 3 striking hard on the valve seat 1 and thereby considerably increasing the risk of breakage. Since the spring arms 9 of the spring plate 7 only have the task of ensuring that the valve is closed securely and remains closed even in a pressure-less state, they can have comparatively slight rigidity with the result that early opening of the closure plate 3 under the effect of the flow forces can be obtained.

The elastic catcher plate 8 formed as a domed spring can be used in suction valves and also in pressure valves. Apart from its use in automatic plate valves of reciprocating compressors, it is also possible to use it in plate valves for other purposes, for instant in non-return valves in pressure lines and the like. The closure plate 3 can also be carried in a substantially friction free manner by flexible guides formed on the plate or by its own guide plate. If in this connection the forces exerted by the guides on the closure plate 3 press the closure plate 3 on to the valve seat 1, its own spring plate can be omitted. Damping plates with rigid catcher plates customarily used for damping the opening strokes of the closure plate can be omitted since the problem of damping is taken over by the domed elastic catcher plate. The rigidity of the domed catcher plate 8 can be selected to meet requirements and is advantageously so dimensioned that the catcher plate lies approximately in one plane in the upper end position of the closure plate 3.

FIG. 2 shows an alternative embodiment in which the spring plate 7 is omitted and in its place flexible spring arms 10 are bent out of the catcher plate 8 towards the valve seat 1. The spring arms 10 press the closure plate 3 on to the valve seat 1 so that its own closure spring is not required. The spring arms 10 can consist of separated ring sections of the catcher plate. Also ring sections can be formed out of the catcher plate as spring elements without separation. In this case also the catcher plate takes over the task of the closure spring system of the valve.

I claim:

1. A plate valve, comprising:
   a valve seat including passage means;
   a flexible closure plate for controlling the flow of a fluid through said passage means;
   a resilient catcher plate for limiting the opening stroke of said closure plate, said catcher plate is in the form of a domed spring with the concave surface thereof facing said valve seat for biasing said closure plate to close said passage means, said catcher plate being mounted at its central portion only along a central axis of said plate valve and extending in spaced relation over said valve seat; and
   whereby said flexible closure plate and said resilient catcher plate provide dampening for the initial opening of said passage means and the elastic deformation of said catcher plate provides an initial closing force for said closure plate.

2. A plate valve as in claim 1 wherein said catcher plate further includes at least one free outer edge portion engaging said closure plate and movable in the direction of the stroke motion of said closure plate.

3. A valve according to claim 2 wherein said catcher plate has a parabolic form.

4. A valve according to claim 2 wherein the distance between the central portion and the outer edge of said catcher plate in the direction of the valve stroke motion of the closure plate is about 40–60% of the stroke of the closure plate.

5. A valve according to claim 2 wherein said catcher plate includes flexible spring members bent towards said valve seat for pressing said closure plate thereon.

6. A plate valve as in claim 1 further comprising a spring plate mounted between said catcher plate and said closure plate and including at least one resilient projection engaging said closure plate for closing said passage means.

* * * * *